United States Patent [19]
Saiki et al.

[11] Patent Number: 6,147,016
[45] Date of Patent: Nov. 14, 2000

[54] LAMINATE SHEET AND TENT MADE THEREFROM

[75] Inventors: Noritugu Saiki; Hodaka Yokomizo, both of Chiba, Japan

[73] Assignee: Teijin Limited, Osaka, Japan

[21] Appl. No.: 09/127,777

[22] Filed: Jul. 31, 1998

[30] Foreign Application Priority Data

Jul. 31, 1997 [JP] Japan .................................. 9-205974
Nov. 27, 1997 [JP] Japan .................................. 9-326054
Mar. 25, 1998 [JP] Japan ................................. 10-077530

[51] Int. Cl.$^7$ .......................... B32B 27/08; B32B 27/12; B32B 27/36
[52] U.S. Cl. ........................... 442/65; 442/136; 442/141; 442/142; 442/164; 428/480; 528/300; 528/301; 528/302; 528/305; 528/307; 528/308; 528/308.6; 528/308.7
[58] Field of Search ............................... 428/480; 442/65, 442/136, 141, 142, 164, 152, 172; 135/87; 528/300, 301, 302, 305, 307, 308, 308.6, 308.7

[56] References Cited

FOREIGN PATENT DOCUMENTS

| | | |
|---|---|---|
| 0 111 360 | 6/1984 | European Pat. Off. . |
| 0 622 488 | 11/1994 | European Pat. Off. . |
| 8142290 | 6/1996 | Japan . |
| 8259787 | 10/1996 | Japan . |
| 8291471 | 11/1996 | Japan . |
| 9053007 | 2/1997 | Japan . |
| 9143346 | 6/1997 | Japan . |
| WO 91 09166 | 6/1991 | WIPO . |

OTHER PUBLICATIONS

Abstract of JP 11 005285, Patent Abstracts of Japan, vol. 099, No. 004, Apr. 30, 1999.

*Primary Examiner*—Vivian Chen
*Attorney, Agent, or Firm*—Sughrue, Mion, Zinn, Macpeak & Seas, PLLC

[57] ABSTRACT

A laminate sheet comprising (A) a polyester block copolymer which comprises 20 to 70 wt % of a hard segment consisting of an aromatic polyester and 80 to 30 wt % of a soft segment consisting of an aromatic polyester and (B) cloth on at least one side of which the polyester block copolymer is laminated, the melting point (T,° C.) of the polyester block copolymer satisfying the following expressions: $T_0-5 > T > T_0-60$ and $T > T'+10$ (in which T is defined above, $T_0$ is a melting point (0° C.) of the aromatic polyester constituting the hard segment, and T' is a melting point (° C.) of a random polymer obtained by adding 0.1 wt % of titanium tetrabutoxide to the polyester block copolymer and melting and kneading at 250° C. for 3 hours).

21 Claims, No Drawings

LAMINATE SHEET AND TENT MADE THEREFROM

DETAILED DESCRIPTION OF THE INVENTION

The present invention relates to a laminate sheet comprising cloth and a polyester block copolymer laminated on the cloth and to a tent made therefrom. More specifically, it relates to a laminate sheet which is excellent in heat resistance, light resistance and stain resistance and preferably further in flame retardancy and flameproofness and to a tent made therefrom.

Heretofore, a laminate sheet comprising cloth and polyvinyl chloride laminated on the cloth has been widely used. However, when this sheet comprising polyvinyl chloride becomes disused and burnt as waste, it generates dioxin, thereby causing a pollution problem. Further, in the case where it is used for a long time, a plasticizer bleeds out on the surface of the sheet and becomes black, thereby deteriorating the outer appearance of the sheet.

When a scrapped sheet is to be recycled, it is difficult to separate one of polyvinyl chloride and polyethylene terephthalate forming cloth from a mixture of these. Even if it is intended to mold the scrapped sheet as it is and to use it for another application, it is difficult to recycle it because these materials differ in molding temperature range.

Therefore, studies on the use of a polymer having pliability, such as an urethane resin, polyester resin or olefin resin, in place of vinyl chloride are widely being conducted. However, especially flameproofness is required for constructional materials that are the large application field of vinyl chloride sheets. Then, an urethane resin, polyester resin or olefin resin has been mixed with a halogen-containing flame retardant or halogen-free flame retardant to reduce the combustibility of a polymer itself and exhibit flameproofness as a molded sheet.

Evaluation on the flame retardancy of a thin constructional material is carried out by subjecting a plate material to the flames of a burner at an angle of 45° and checking the spreading fire as described in JIS-A1322. Therefore, a large amount of a flame retardant for preventing spread of burning is contained in a plate material to reduce the combustion speed and extinguish a fire by itself.

However, in these conventional methods, a large amount of a flame retardant must be added to provide flameproofness, thereby greatly deteriorating the mechanical properties and scratch resistance of a molded sheet. Therefore, they are not suitable for practical application.

JP-A 8-142290 (the term "JP-A" as used herein means an "unexamined published Japanese patent application") discloses a fiber-reinforced sheet in which a polyester elastomer sheet molded by calendering is coated on at least one side of woven cloth of polyester drawn yarn and having a peel strength between the sheet and the cloth, measured in accordance with the K6328 test method, of 1.5 kg/cm or more. A block copolymer comprising aliphatic polyether units and/or aliphatic polyester units as a low-melting polymer segment(s) is disclosed as the above polyester elastomer.

JP-A 8-259787 discloses a flame-retardant elastomer composition comprising 100 parts by weight of a thermoplastic elastomer, 0.1 to 50 parts by weight of a phosphorus compound and 0.1 to 50 parts by weight of a nitrogen-containing compound. As the above thermoplastic elastomer, a block copolymer comprising polyoxytetramethylene glycol as a soft segment and a block copolymer comprising poly-e-caprolactone as a soft segment are disclosed in examples of JP-A 8-259787.

JP-A 8-291471 discloses waterproof cloth comprising a polyester fabric base and a polyester polymer coated on the fabric base and having a water pressure resistance (in accordance with the low-pressure method of JIS-L-1092) of 1,000 mm $H_2O$. Poly(hydroxy acids) such as polylactic acid and poly($\omega$-hydroxyalkanoates) such as poly($\epsilon$-caprolactone) and poly($\beta$-propiolactone) are disclosed as the above polyester polymer in this literature.

JP-A 9-53007 discloses a flame retardant composition comprising 100 parts by weight of a mixture of 100 to 10 wt % of a polyester block copolymer and 0 to 90 wt % of a polyalkylene terephthalate resin and 5 to 150 parts by weight of a phosphorus compound and/or a triazine compound. A polymer comprising a polyester obtained from dimethyl isophthalate, dimethyl sebacate and hexamethylene glycol as a soft segment is disclosed as the above polyester block copolymer in its examples. It also teaches that the above composition is useful as a coating agent for electric wires.

JP-A 9-143346 discloses a flame retardant composition comprising 100 parts by weight of a polyester block copolymer, 1 to 100 pats by weight of ammonium sulfate and 1 to 100 parts by weight of a melamine compound. A polymer comprising a polyester obtained from dimethyl isophthalate, dimethyl sebacate and hexamethylene glycol as a soft segment is disclosed as the above polyester block copolymer in its examples. It also teaches that the above composition is useful as a coating agent for electric wires.

It is an object of the present invention to provide a laminate sheet comprising cloth and a polyester block copolymer laminated on the cloth.

It is another object of the present invention to provide a laminate sheet which is free from a pollution problem which is caused by use of a polyvinyl chloride resin and the like, has improved heat resistance, is strong resistance to contamination, can wash away stains with ease even when it is stained, and hardly undergoes discoloration due to deterioration by ultraviolet light when it is exposed outdoors.

It is still another object of the present invention to provide a laminate sheet that can be recycled and does not contain halogen elements.

It is a further object of the present invention to provide a laminate sheet having excellent flame retardancy and flameproofness.

It is a still further object of the present invention to provide a tent which is made from the above laminate sheet of the present invention and is excellent in heat resistance, light resistance and stain resistance and preferably further in flame retardancy and flameproofness.

Other objects and advantages of the present invention will become apparent from the following description.

According to the present invention, firstly, the above objects and advantages of the present invention can be attained by a laminate sheet comprising (A) a polyester block copolymer which comprises 20 to 70 wt % of a hard segment consisting of an aromatic polyester comprising terephthalic acid in an amount of at least 60 mol % of the total of all dicarboxylic acid components and tetramethylene glycol in an amount of at least 60 mol % of the total of all diol components, and 80 to 30 wt % of a soft segment consisting of an aromatic polyester comprising at least one diol selected from the group consisting of diols represented by the following formula (1):

(1)

wherein n is a number of 2 to 5, and aliphatic diols represented by the following formula (2):

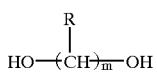
(2)

wherein m is a number of 5 to 12, and R is a hydrogen atom or a methyl group, provided that a plurality of R's may be the same or different,
in an amount of at least 60 mol % of the total of all diol components and an aromatic dicarboxylic acid in an amount of at least 60 mol % of the total of all dicarboxylic acid components,
the melting point (T,° C.) of the polyester block copolymer satisfying the following expressions (3) and (4):

$$T_0-5 > T > T_0-60 \quad (3)$$

$$T > T'+10 \quad (4)$$

wherein T is defined above, $T_0$ is a melting point (° C.) of the aromatic polyester constituting the hard segment, and T' is a melting point (° C.) of a random polymer obtained by adding 0.1 wt % of titanium tetrabutoxide to the polyester block copolymer and melting and kneading at 250° C. for 3 hours; and
(B) cloth on at least one side of which the polyester block copolymer is laminated.

The polyester block copolymer used in the present invention comprises a hard segment and a soft segment.

The hard segment consists of an aromatic polyester which comprises terephthalic acid in an amount of at east 60 mol % of the total of all dicarboxylic acid components and tetramethylene glycol in an amount of at least 60 mol % of the total of all diol components.

A dicarboxylic acid other than terephthalic acid may be an aromatic dicarboxylic acid (excluding terephthalic acid) or aliphatic dicarboxylic acid. The aromatic dicarboxylic acid other than terephthalic acid is isophthalic acid, phthalic acid, naphthalenedicarboxylic acid or the like. The aliphatic dicarboxylic acid is preferably a straight-chain or branched-chain aliphatic dicarboxylic acid having 4 to 12 carbon atoms or alicyclic dicarboxylic acid, as exemplified by adipic acid, sebacic acid, cyclohexanedicarboxylic acid and the like. Of these, straight-chain and branched-chain aliphatic dicarboxylic acids having 8 to 12 carbon atoms are particularly preferred. Terephthalic acid is preferably contained in an amount of at least 70 mol % of the total of all dicarboxylic acid components of the aromatic polyester of the hard segment.

A diol other than tetramethylene glycol may be an aliphatic glycol (excluding tetramethylene glycol) or alicyclic glycol. The aliphatic glycol other than tetramethylene glycol is preferably an aliphatic diol having 2 to 12 carbon atoms such as a straight-chain or branched-chain glycol exemplified by ethylene glycol, hexamethylene glycol, decamethylene glycol, 3-methylpentamethylene glycol and 2-methylnonamethylene glycol. The alicyclic glycol is, for example, cyclohexanedimethanol. Tetramethylene glycol is preferably contained in an amount of at least 70 mol % of the total of all dicarboxylic acid components of the aromatic polyester of the hard segment.

The soft segment consists of an aromatic polyester which comprises an aromatic dicarboxylic acid in an amount of at least 60 mol % of the total of all dicarboxylic acid components and at least one diol selected from the group consisting of diols represented by the above formula (1) and diols represented by the above formula (2) in an amount of at least 60 mol % of the total of all diol components.

The aromatic dicarboxylic acid which is contained in an amount of at least 60 mol %, preferably at least 70 mol %, of-the total of all dicarboxylic acid components is preferably terephthalic acid, isophthalic acid or naphthalenedicarboxylic acid.

A dicarboxylic acid other than the aromatic dicarboxylic acid is preferably a straight-chain or branched-chain aliphatic dicarboxylic acid having 4 to 12 carbon atoms or alicyclic dicarboxylic acid. Illustrative examples of the dicarboxylic acid are the same as those listed for the hard segment.

Of glycols which can be contained in an amount of at east 60 mol %, preferably at least 70 mol %, of the total of all diol components, the glycols represented by the bove formula (1) are

These glycols may be used alone or in combination of two or more.

A laminate sheet obtained from the glycol of the formula (1) in which n is 1 is hard and a laminate sheet obtained from the glycol of the formula (1) in which n is 6 or more has too high moisture absorption. The diol of the formula (1) in which n is 3 or 4 is preferred.

The aliphatic diols represented by the formula (2) include pentamethylene glycol, hexamethylene glycol, decamethylene glycol, dodecamethylene glycol, 3-methylpentamethylene glycol and 2-methylnonamethylene glycol. Of these, hexamethylene glycol, decamethylene glycol, 3-methylpentamethylene glycol and 2-methylnonamethylene glycol are preferred.

A diol other than the diols represented by the above formulas (1) and (2) is preferably a straight-chain aliphatic diol having 2 to 5 carbon atoms or polyoxyalkylene glycol having a molecular weight of 300 to 1,200. Of these, a polyoxyalkylene glycol having a molecular weight of 300 to 1,200 is particularly preferred because it improves compatibility with the hard segment and the impact resistance at low-temperatures of the obtained polyester block copolymer. The polyoxyalkylene glycol is preferably contained in the obtained polyester block copolymer in an amount of 5 to wt %, more preferably 5 to 20 wt %. The copolymerization of a polyoxyalkylene glycol in the above range is preferred because it improves properties at low-temperatures. When the amount of the polyoxyalkylene glycol is too large, chemical resistance lowers disadvantageously.

The straight-chain aliphatic diol having 2 to 5 carbon atoms is, for example, ethylene glycol, trimethylene glycol, tetramethylene glycol or pentamethylene glycol. The polyoxyalkylene glycol having a molecular weight of 300 to 1,200, preferably 500 to 1,000, is preferably polyoxyethylene glycol, polyoxypropylene glycol or polyoxytetramethylene glycol. Of these, polyoxytetramethylene glycol is particularly preferred.

The polyester block copolymer used in the present invention has a melting point (T,° C.) which satisfies the following expressions (3) and (4):

$$T_0-5 > T > T_0-60 \quad (3)$$

$$T > T'+10 \quad (4)$$

wherein T is the same as defined above, $T_0$ is a melting point (° C.) of the aromatic polyester constituting the hard segment, and T' is a melting point (° C.) of a random polymer obtained by adding 0.1 wt % of titanium tetrabutoxide to the polyester block copolymer and melting and kneading at 250° C. for 3 hours.

The above expression (3) indicates that the melting point (T° C.) of the polyester block copolymer is in the range of 5 to 60° C. lower than the melting point ($T_0$° C.) of the aromatic polyester constituting the hard segment of the polyester block copolymer.

The above expression (4) indicates that the melting point (T° C.) of the polyester block copolymer is more than 10° C. higher than the melting point (T'° C.) of the random polymer comprising the same constituents as the polyester block copolymer.

The relationship of the above expression (3) is more preferably a relationship represented by the following expression (3)-1.

$$T_0-5 > T > T_0-50 \quad (3)-1$$

wherein T and $T_0$ are the same as defined above.

The melting point (T) is 150° C. or higher, preferably 160° C. or higher, when the random copolymer is amorphous and its melting point cannot be determined. This melting point, however, is preferably 210° C. or lower, more preferably 200° C. or lower. When the random copolymer is amorphous and its melting point cannot be determined, the melting point is considered as 0° C.

When a random copolymer is used in place of the polyester block copolymer in the present invention, the random copolymer is generally amorphous, has a low glass transition temperature and is like water-glass. Therefore, when it is tried to make a sheet from the random copolymer, the random copolymer is wound round a roller. Even if a sheet can be formed from the random copolymer, sheets stick to each other, that is, a blocking phenomenon occurs, or the surface of the sheet is sticky. Therefore, it cannot be used actually.

The polyester block copolymer used in the present invention preferably comprises 25 to 50 wt % of a hard segment and 75 to 50 wt % of a soft segment. When the amount of the hard segment is above the upper limit, the obtained polyester block copolymer becomes too hard to deal undesirably. When the amount of the soft segment is above the upper limit, undesirably, the obtained polyester block copolymer has low crystallinity, is difficult to be molded and has sticky feel.

The segment length of each of the soft segment and the hard segment of the polyester block copolymer is preferably 500 to 7,000, more preferably 800 to 5,000 in terms of molecular weight. Although it is difficult to measure this segment length directly, it can be estimated from the compositions of the polyesters constituting the soft segment and the hard segment, the melting point of the component(s) constituting the hard segment and the melting point of the obtained polyester block copolymer, using the Flory equation.

Methods for producing the polyester block copolymer include one in which polymers constituting the soft segment and the hard segment are first produced, and then, melt-mixed such that the melting point of the polyester block copolymer should be lower than that of the polyester constituting the hard segment.

Since this melting point changes according to the mixing temperature and time, it is preferred that a catalyst is deactivated by adding a catalyst deactivating agent such as oxyphosphoric acid or the like at the time when a targeted melting point is reached.

As the catalyst deactivating agent, phosphoric acid, phosphorous acid, organic sulfonic acid or the like is added in a molar amount equal to, preferably 1.2 times or more and less than 3 times, the metal atoms of titanium or tin compound added as a catalyst.

The polyester block copolymer used in the present invention preferably has an intrinsic viscosity, measured at 35° C. in orthochlorophenol, of 0.6 or more, more preferably 0.8 to 1.5. When the intrinsic viscosity is lower than 0.6, its strength lowers disadvantageously.

Polybutylene terephthalate may be added, as required, to the polyester block copolymer in the present invention. This is effective in controlling hardness, improving the crystallinity of a sheet and removing stickiness. The amount of the polybutylene terephthalate is 100 parts by weight or lower, preferably 5 to 50 parts by weight, based on 100 parts by weight of the polyester block copolymer. When the amount is above 100 parts by weight, the obtained sheet becomes hard and the feeling of the laminate sheet lowers. This polybutylene terephthalate may comprise butylene terephthalate units and may contain other dicarboxylic acid or diol as the copolymer component in an amount of 20 mol % or less of the total of all dicarboxylic acid components. Illustrative examples of this component to be copolymerized are the same as those listed for the copolymer component constituting the hard segment. This polybutylene terephthalate has an intrinsic viscosity of 0.6 to 1.2, preferably 0.7 to 1.1. When the intrinsic viscosity is above that limit, mixing becomes difficult, while when the intrinsic viscosity is below that limit, its strength lowers.

In the present invention, at least one phosphorus compound selected from the group consisting of ammonium phosphate, ammonium polyphosphate, melamine phosphate, melamine polyphosphate, phosphoric amide and polyphosphoric amide can be mixed with the polyester block copolymer or a mixture of the polyester block polymer and polybutylene terephthalate. Melamine cyanurate may be further blended as required. Ammonium polyphosphate is particularly preferred from the view points of stability in the compounding step and difficulty in bleeding-out.

As the ammonium polyphosphate, the one represented by the general formula $(NH_4)_{n+2}P_nO_{3n+1}$ (wherein n is a number of 10 to 1,000) is preferred from the view point of dispersibility into the polyester resin, and it is preferably powdery and sparingly soluble in water. It is desirable, therefore, to enhance its dispersibility by pulverizing and then treating it with a surface-treating agent prior to use.

The above melamine polyphosphate is shown by the following formula,

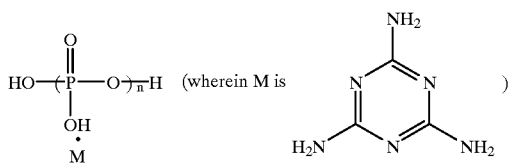

Above all, the one of which the molar ratio of melamine/phosphoric acid is 0.1 to 10, preferably 0.5 to 2, is superior in the effect of flame retardancy. It is preferable that this compound is also treated with a surface treating agent prior to use in order to increase its water resistance and to enhance the dispersibility into the resin.

The amount of the phosphorus compound must be determined by the amount of the polyethylene terephthalate cloth used in the laminate sheet and whether melamine cyanurate is used or not. Although not always fixed, it is used in an amount of 5 to 200 parts by weight based on 100 parts by weight of the polyester block copolymer, preferably 10 to 100 parts by weight, based on 100 parts by weight of the total of the polyester block copolymer and other organic substance (such as polybutylene terephthalate).

Melamine cyanurate is used in an amount of 0.1 to 10 parts by weight, preferably 0.3 to 5 parts by weight based on 1 part by weight of ammonium polyphosphate. When the amount of the flame retardant is too small, its flame retarding effect is insufficient, while when the amount is too large, the resulting laminate sheet becomes hard or fragile due to lack of extensibility.

In the present invention, the polyester block copolymer may further contain an organic sulfonate. The organic sulfonate is a decomposition promoting agent which has no effect of decomposing a polymer or reducing melt viscosity at a normal processing temperature, i.e., 250° C. or lower but has the property that it decomposes at a temperature of 350° C. or higher at which a polymer ignites. A decomposition product of the organic sulfonate reduces the molecular weight of the polyester block copolymer resin composition and greatly lowers the melt viscosity thereof.

Examples of the organic sulfonate are an alkali metal salt or alkaline earth metal salt of an aliphatic, aromatic or heterocyclic sulfonic acid. Illustrative examples of the organic sulfonate include alkali metals and alkali earth metal salts of aromatic sulfonic acids, substituted aromatic sulfonic acids, aromatic sulfone sulfonic acids, aromatic ketone sulfonic acids, heterocyclic sulfonic acids, halogenated methane sulfonic acids, perfluoroalkane sulfonic acids, aromatic sulfide sulfonic acids, aromatic ether sulfonic acids, aliphatic and olefinic sulfonic acids, phenol ester sulfonic acids and aromatic amide sulfonic acids. Potassium sulfonates of diphenyl sulfone are preferred, and diphenyl-1-sulfone-3-potassium sulfonate are particularly preferred from the viewpoints of polymer coloration at a decomposition temperature and processing temperature. These organic sulfonates may be a low-molecular weight compound or polymer.

The organic sulfonate is used in an amount of 0.01 to 10 parts by weight, preferably 0.1 to 5 parts by weight, based on 100 parts by weight of the polyester block copolymer. When the amount of the organic sulfonate is more than 10 parts by weight, other physical properties such as scratch resistance may deteriorate disadvantageously.

The polyester block copolymer composition used in the present invention may contain other polymer, stabilizer, pigment, dye, nucleating agent, lubricant and other additives other than the composition of the present invention. The total amount of these additives and polymer is 0.01 to 30 parts by weight based on 100 parts by weight of the composition of the present invention.

In the present invention, the polyester block copolymer is bonded to at least one side of cloth to form a laminate sheet. This laminate sheet can be produced by extruding the mol % en polyester block copolymer onto the cloth using an extruder or pressing the polyester block copolymer kneaded by calender rolls with a rubber roll to push at least part of the polyester block copolymer into the cloth and bond it to the cloth. However, it is a matter of course that the present invention can be carried out by bonding the polyester block copolymer by another method. The weight ratio of the cloth to the polyester block copolymer is generally 1:0.1 to 10, preferably 1:0.2 to 5.

The cloth used in the present invention is either woven or non-woven cloth. To produce a laminate sheet for use as a tent, cloth which has properties required for the tent must be selected.

For example, when the laminate sheet is used as a tent, it must have high strength, so cloth having high strength is generally used. For instance, cloth woven of fibers of 200 to 1,000 denier having a strength of 5 g/de or more is often used. The density of this cloth is generally 5 to 100 fibers per inch, though it differs according to application.

Since the thus obtained laminate sheet has flame retardancy, flexibility, light resistance and resistance to flex fatigue required-for a tent, bonding is carried out by heat or an adhesive as required to make it usable as a tent.

The following examples are given to further illustrate the present invention. In the following examples, "parts" means "parts by weight".

REFERENCE EXAMPLE 1

180 Parts of dimethyl terephthalate, 20 parts of dimethyl sebacate, 140 parts of tetraethylene glycol and 30 parts of diethylene glycol were subjected to an ester exchange reaction in the presence of a dibutyltin diacetate catalyst, and then polycondensed at a reduced pressure to obtain a polyester having an intrinsic viscosity of 1.01. 107 Parts of a polybutylene terephthalate chip having an intrinsic viscosity of 0.98 which was separately prepared by polycondensation similarly and dried was added to the above polyester. The mixture was allowed to react with each other at 240° C. for 45 minutes, and 0.1 part of phenylphosphonic acid was added to stop the reaction. The obtained polyester block copolymer was taken out and formed into a chip for use as a raw material. The polyester block copolymer had a melting point of 192° C. and an intrinsic viscosity of 1.02.

REFERENCE EXAMPLE 2

180 Parts of dimethyl isophthalate, 20 parts of dimethyl sebacate and 170 parts of hexamethylene glycol were subjected to an ester exchange reaction in the presence of a dibutyltin diacetate catalyst, and then polycondensed at a reduced pressure to obtain a polyester having an intrinsic viscosity of 1.06. 107 Parts of a polybutylene terephthalate chip having an intrinsic viscosity of 0.98 which was separately prepared by polycondensation similarly and dried was added to the above polyester. The mixture was allowed to react with each other at 240° C. for 45 minutes, and 0.1 part of phenylphosphonic acid was added to stop the reaction. The obtained polyester block copolymer was taken out and formed into a chip for use as a raw material. The polyester block copolymer had a melting point of 204° C. and an intrinsic viscosity of 1.07.

REFERENCE EXAMPLE 3

65 Parts of dimethyl terephthalate, 120 parts of polytetramethylene glycol (average molecular weight of 1,000) and 61 parts of tetramethylene glycol were polymerized in the presence of a tetrabutoxy titanate catalyst in accordance with a commonly used method to obtain poly(oxyalkylene)glycol copolytetramethylene terephthalate having an intrinsic viscosity of 1.42.

EXAMPLE 1

The polyester block copolymer of Reference Example 1 was extruded onto cloth (polyester plain-woven fabric) (500 de., 40 warps per inch and 40 wefts per inch) by a T-die extruder and laminated together by pressing them with nip rolls immediately. At this point, the amount of the polymer laminated on the cloth was 230 g/m².

When the stain resistance of the polymer-laminated surface of the resulting laminate sheet was evaluated, no change was found. When the heat resistance of the laminate sheet was evaluated at 180° C., the gloss of the laminate sheet slightly changed but did not change with boiling water. As for weatherability, there was observed a slight change.

The stain resistance, heat resistance and weatherability of the laminate sheet were measured in accordance with the following methods.

[stain resistance]

Stain resistance to coffee, soy sauce and acetone was evaluated in accordance with JIS K6902.

[heat resistance]

Heat resistance at a test temperature of 180° C. and with boiling water was evaluated in accordance with JIS K6902.

[weatherability]

The surface state of a sample after the passage of 1,500 hours at 63° C. with no rain was evaluated using a weatherometer in accordance with JIS K7102.

EXAMPLE 2

A sample was prepared from the polyester block copolymer of Reference Example 2 and evaluated in the same manner as in Example 1. As a result, as for evaluation on stain resistance, no change was observed. As for evaluation on heat resistance, the gloss slightly changed at 180° C. and did not change with boiling water. As for weatherability, there was a slight change. These properties were measured in the same manner as in Example 1.

COMPARATIVE EXAMPLE 1

A sample was prepared from the polyester block copolymer of Reference Example 3 and evaluated in the same manner as in Example 1. As a result, as for evaluation on stain resistance, there was a considerable change to coffee and soy sauce. As for heat resistance, the gloss slightly changed at 180° C. and did not change with boiling water. As for weatherability, there was observed a marked change. These properties were measured in the same manner as in Example 1.

COMPARATIVE EXAMPLE 2

The same evaluations as in Example 1 were made using a commercially available soft vinyl chloride sheet. As a result, as for stain resistance, there was a considerable change to coffee and soy sauce. As for evaluation on heat resistance at 180° C., the surface of the sheet was in a mol % en state and as for evaluation on heat resistance with boiling water, there were observed deformation in the shape and change in the gloss of the sheet. As for weatherability, deterioration was marked with a cracked surface. These properties were measured in the same manner in Example 1.

EXAMPLES 3 to 5 AND COMPARATIVE EXAMPLE 3

[production of polyester block copolymer 1]

175 Parts of dimethyl isophthalate, 23 parts of dimethyl sebacate and 140 parts of hexamethylene glycol were subjected to an ester exchange reaction in the presence of a dibutyltin diacetate catalyst, and then polycondensed at a reduced pressure to obtain an amorphous polyester (a) having an intrinsic viscosity of 1.06 and no endothermic peak due to the melting of crystals measured by a DSC method. 107 Parts of a polybutylene terephthalate (b) chip having an intrinsic viscosity of 0.98 which was separately prepared by polycondensation similarly and dried was added to the above polyester. The mixture was allowed to react with each other at 240° C. for 45 minutes, and 0.1 part of phenylphosphonic acid was added to stop the reaction. The obtained polyester block copolymer was taken out and formed into a chip for use as a raw material. This chip had a melting point of 190° C. and an intrinsic viscosity of 0.93. A random copolymer composed of the above whole components had no melting point and hence, the melting point (T') is considered as 0° C.

[production of polyester block copolymer 2]

194 Parts of dimethyl terephthalate and 160 parts of triethylene glycol were subjected to an ester exchange reaction in the presence of a dibutyltin diacetate catalyst, and then polycondensed at a reduced pressure to obtain a water glass-like polyester (a) having an intrinsic viscosity of 0.76. 107 Parts of a polybutylene terephthalate (b) chip having an intrinsic viscosity of 0.98 which was separately prepared by polycondensation similarly and dried was added to the above polyester. The mixture was allowed to react with each other at 250° C. for 75 minutes, and 0.1 part of phenylphosphonic acid was added to stop the reaction. The obtained polyester block copolymer was taken out and formed into a chip for use as a raw material. This chip had a melting point of 176° C. and an intrinsic viscosity of 0.83. A random copolymer composed of the above whole components had no melting point and hence, the melting point (T') is considered as 0° C.

[production of polyester block copolymer 3]

180 Parts of dimethyl terephthalate, 20 parts of dimethyl sebacate, 140 parts of tetraethylene glycol and 30 parts of diethylene glycol were subjected to an ester exchange reaction in the presence of a dibutyltin diacetate catalyst, and then polycondensed at a reduced pressure to obtain a polyester having an intrinsic viscosity of 1.06. A polyester block copolymer was obtained from this polyester in the same manner as in the step of the polyester block copolymer 1 and formed into a chip. This chip had a melting point of 185° C. A random copolymer composed of the above whole components had no melting point and hence, the melting point (T') is considered as 0° C.

[production of polyester block copolymer 4]

245 Parts of dimethyl terephthalate, 399 parts of polytetramethylene glycol (average molecular weight of 2,000) and 159 parts of tetramethylene glycol were polymerized in the presence of a tetrabutoxy titanate catalyst in accordance with a commonly used method to obtain a polyester block copolymer having an intrinsic viscosity of 1.42 and comprising 38 wt % of a hard segment. The amount of the hard segment was obtained from the amount of polytetramethylene glycol charged based on the amount of the polymer after polymerization. The polymer had a melting point of 198° C.

[production and evaluation of sheet]

Each of molten elastomers shown in Table 1 was extruded and laminated on cloth using a T die extruder and impregnated into the cloth by pressing with a lip roller to form a laminate sheet (for Examples 3 to 5). This sheet had a thickness of 600 μm and a width of 50 cm.

Separately, a sheet (for Comparative Example 3) was formed using an elastomer shown in Table 1 by T-die extrusion and evaluated. This sheet was not laminated with cloth to clearly evaluate the properties of the polyester elastomer and had a thickness of 600 μm and a width of 50 cm.

The evaluation results are shown in Table 1.

TABLE 1

|  | Ex.3 | Ex.4 | Ex.5 | C.Ex.3 |
|---|---|---|---|---|
| Elastomer1 | 100 wt % | — | — | — |
| Elastomer2 | — | 100 wt % | — | — |
| Elastomer3 | — | — | 100 wt % | — |
| Elastomer4 | — | — | — | 100 wt % |
| heat resistance elongation retention | 96% | 94% | 85% | 5% |
| light resistance elongation retention | 73% | 88% | 64% | 23% |
| stain resistance (to coffee, soil) | not stained | not stained | slightly stained | considerably stained |

Compared with Comparative Example 3 in which an ester-ether type polyester elastomer was used, sheets comprising an ester-ester type polyester elastomer of the present invention were excellent not only in heat resistance and light resistance but also in stain resistance.

Therefore, a fiber-reinforced sheet comprising an ester-ester type polyester elastomer of the present invention is hardly stained and can exhibit excellent durability, even it is used as tent cloth outdoors for a long time.

The heat resistance, light resistance and stain resistance of Examples 3 to 5 and Comparative Example 3 were evaluated in accordance with the following methods.

[heat resistance]

A sheet molded with a T die is punched with a dumbbell die in accordance with JIS K7113, the punched sample piece is left to stand for 500 hours in an atmosphere of 150° C., a tensile test is made on the sample to measure its tensile elongation at break, and retentions of tensile elongation at break after and before a heat treatment are evaluated.

[light resistance]

A sheet molded with a T die is punched with a dumbbell die in accordance with JIS K7113, the punched sample piece is exposed to ultraviolet light of 90 W/m$^2$ at 63° C. using a xenon weather meter, a tensile test is made on the sample in accordance with JIS K7113 after the passage of 200 hours to measure its tensile elongation at break, and retentions of tensile elongation at break after and before exposure to ultraviolet light are evaluated.

[stain resistance]

A commercial coffee drink is dropped on a sheet molded with a T die and the resultant sheet is left to stand at room temperature for 2 days. Thereafter, the surface of the sheet is washed with water, and the existence of stains on the sheet is observed with the eye for evaluation.

EXAMPLE 6

The same polyester block copolymer as the polyester block copolymer 2 used in Example 3 was compounded with a phosphoric acid compound in a proportion shown in Table 2 at 230° C. by an extruder. This compound was extruded, through the T die of an extruder equipped with a T die, onto cloth sandwiched between a rubber roll having a hardness of 80A and a cooling roll having a temperature of 40° C. The above compound was also laminated on the other side of the cloth of the obtained laminate to form a laminate sheet having a resin layer on both sides. The properties of this laminate sheet are shown in Table 2.

EXAMPLES 7 AND 8

Laminate sheets were obtained in the same manner as in Example 6 except that the polyester block copolymer of Reference Example 1 used in Example 1 and the polyester block copolymer of Reference Example 2 used in Example 2 were used in place of the polyester block copolymer used in Example 6. The properties of the obtained laminate sheets are shown in Table 2.

EXAMPLE 9

A laminate sheet was obtained in the same manner as in Example 6 except that the polyester block copolymer of Reference Example 2 used in Example 2 and PBT were used in a weight ratio of 90/10 in place of the polyester block copolymer used in Example 6. The properties of the obtained laminate sheet are shown in Table 2.

COMPARATIVE EXAMPLE 4

A laminate sheet was obtained in the same manner as in Example 6 except that the polyester block copolymer of Reference Example 3 used in Comparative Example 3 was used in place of the polyester block copolymer used in Example 6. The properties of the obtained laminate sheet are shown in Table 2.

TABLE 2

|  | polyester block copolymer | PBT | flame retardant (wt % based on resin) | resin/cloth/ resin weight ratio | flame retardancy | flex resistance | light resistance |
|---|---|---|---|---|---|---|---|
| Ex. 6 | polyester block copolymer 2 | 0 | APP/MC (15/15) | 150/100/200 | 10 cm$^2$ | no change | 97% (slightly yellowed) |
| Ex. 7 | Ref. Ex. 1 | 0 | AmP(30) | 200/100/200 | 11 cm$^2$ | no change | 98% (slightly yellowed) |
| Ex. 8 | Ref. Ex. 2 | 0 | Pad(25) | 200/100/200 | 10 cm$^2$ | no change | 100% (no change) |
| Ex. 9 | Ref. Ex. 2 | PBT/polyester block copolymer = 10/90 (weight ratio) | MP(30) | 200/100/200 | 9 cm$^2$ | no change | 102% (no change) |

TABLE 2-continued

| | polyester block copolymer | PBT | flame retardant (wt % based on resin) | resin/cloth/ resin weight ratio | flame retardancy | flex resistance | light resistance |
|---|---|---|---|---|---|---|---|
| C. Ex. 4 | Ref. Ex. 3 | 0 | APP/MC (20/20) | 200/100/200 | burning down | no change | 95% (surface cracked) |

Abbreviation of flame retardants:
APP: ammonium polyphosphate (Terraju C60 of Chisso Corp.)
MC: melamine cyanurate (MC440 of Nissan Chemical Industries, Ltd.)
AmP: ammonium phosphate (reagent).
Pad: phosphoric amide (reagent)
MP: melamine phosphate (PNP100 of Nissan Chemical Industries, Ltd.)
PBT: polybutylene terephthalate (having intrinsic viscosity of 0.93)

The properties of Examples 6 to 9 and Comparative Example 4 were measured in accordance with the following methods.

[flame retardancy]

This is measured in terms of carbonated area in accordance with the Meeker burner method of the flameproofing test method of the Ordinance of the Ministry of Home Affairs.

[light resistance]

A sheet molded with a T die is punched with a dumbbell die in accordance with JIS K7113, the punched sample piece is exposed to ultraviolet light of 90 W/m$^2$ at 63° C. using a xenon weather meter, a tensile test is made on the sample in accordance with JIS K7113 after the passage of 1,000 hours to measure its tensile elongation at break, and retentions of tensile elongation at break after and before exposure to ultraviolet light are evaluated. The outer appearance of the sheet is evaluated with the eye.

[flex resistance]

A laminate sheet having a width of 1 cm is grasped at chuck intervals of 100 mm. Flexing is conducted on the aminate sheet in a vertical direction 100,000 times at chuck intervals of 5 mm and 100 mm. The flex resistance is evaluated based on the outer appearance of the laminate sheet.

EXAMPLE 10

[polyester block copolymer 5]

180 Parts of dimethyl isophthalate, 20 parts of dimethyl sebacate and 170 parts of hexamethylene glycol were subjected to an ester exchange reaction in the presence of a dibutyltin diacetate catalyst, and then polycondensed at a reduced pressure to obtain a water glass-like polyester (a) having an intrinsic viscosity of 5 0.76. 107 Parts of a polybutylene terephthalate (b) chip having an intrinsic viscosity of 0.98 which was separately prepared by polycondensation and dried was added to the above polyester. The mixture was allowed to react with each other at 250° C. for 75 minutes, and 0.1 part of phenylphosphonic acid was added to stop the reaction. The obtained polyester block copolymer was taken out and formed into a chip for use as a raw material. The chip had a melting point of 204° C. and an intrinsic viscosity of 0.83.

[laminate sheet]

A resin composition comprising the polyester block copolymer 5 and 1 part of a diphenyl-1-sulfone-3-potassium sulfonate was laminated on cloth in accordance with the above method. As a result, the flameproofness of the obtained laminate sheet stood the test with a carbonated length of 10 cm or less and an after-flaming time of 5 sec or less, which satisfied the passing Incombustibility level II. The laminate sheet had satisfactory scratch resistance and a viscosity retention of 96%.

COMPARATIVE EXAMPLE 5

A resin composition comprising the polyester block copolymer 5 and 20 parts of ammonium sulfate was laminated on cloth in accordance with the above method. As a result, the obtained laminate sheet had flameproofness of the passing Incombustibility level II but was inferior in scratch resistance and a viscosity retention of 85%.

COMPARATIVE EXAMPLE 6

A resin composition comprising the polyester block copolymer 5 and 2 parts of zinc sulfate was laminated on cloth in accordance with the above method. As a result, the flameproofness of the obtained laminate sheet could not pass the Incombustibility level II with a carbonated length of 20 cm or more and an after-flaming time of 10 sec. or more. The laminate sheet had satisfactory scratch resistance but a viscosity retention of 64%, and was liable to thermally decompose at a processing temperature.

The properties of Example 10 and Comparative Examples 5 and 6 were measured in accordance with the following methods.

[flame retardancy test]

This is evaluated by a 45° nickel burner method in accordance with the JIS A-1322 flame retardancy test for thin film materials for construction.

[surface scratch resistance]

The surface of a sheet is rubbed with an HB pencil and whether the surface is scratched is observed with the eye.

[heat stability]

MFR at 250° C. which is the processing temperature is evaluated. When the MFR value for a residence time of 2 minutes is represented by M1 and the MFR value for a residence time of 6 minutes is represented by M2, the viscosity retention (%) is obtained from the following expression.

$$\text{Viscosity retention (\%)} = (M2-M1)/M1 \times 100$$

What is claimed is:

1. A laminate sheet comprising:
  (A) a polyester block copolymer which comprises 20 to 70 wt % of a hard segment consisting of an aromatic polyester comprising terephthalic acid in an amount of at least 60 mol % of the total of all dicarboxylic acid components and tetramethylene glycol in an amount of at least 60 mol % of the total of all diol components, and 80 to 30 wt % of a soft segment consisting of an aromatic polyester comprising at least one diol selected from the group consisting of diols represented by the following formula (1):

(1)

wherein n is a number of 2 to 5,
and aliphatic diols represented by the following formula (2):

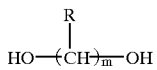

(2)

wherein m is a number of 5 to 12, and R is a hydrogen atom or a methyl group, provided that a plurality of R's may be the same or different,
in an amount of at least 60 mol % of the total of all diol components and an aromatic dicarboxylic acid in an amount of at least 60 mol % of the total of all dicarboxylic acid components,
the melting point (T,° C.) of the polyester block copolymer satisfying the following expressions (3) and (4):

$$T_0-5 > T > T_0-60 \qquad (3)$$

$$T > T'+10 \qquad (4)$$

wherein T is defined above, $T_0$ is a melting point (° C.) of the aromatic polyester constituting the hard segment, and T' is a melting point (° C.) of a random polymer obtained by adding 0.1 wt % of titanium tetrabutoxide to the polyester block copolymer and melting and kneading at 250° C. for 3 hours; and (B) cloth on at least one side of which the polyester block copolymer is laminated.

2. The laminate sheet of claim 1, wherein a blend of 100 parts by weight of the polyester block copolymer and 100 parts or less by weight of polybutylene terephthalate is laminated on at least one side of the cloth in place of the polyester block copolymer.

3. The laminate sheet of claim 1 or 2, wherein a blend of 100 parts by weight of the polyester block copolymer and 5 to 200 parts by weight of at least one phosphorus compound selected from the group consisting of ammonium phosphates, ammonium polyphosphates, melamine phosphates, melamine polyphosphates, phosphoric amide and polyphosphoric amide is laminated on at least one side of the cloth in place of the polyester block copolymer.

4. The laminate sheet of claim 1 or 2, wherein a blend of 100 parts by weight of the polyester block copolymer and 0.01 to 10 parts by weight of an organic sulfonate is laminated on at least one side of the cloth in place of the polyester block copolymer.

5. The laminate sheet of claim 1, wherein terephthalic acid is contained in an amount of at least 70 mol % of the total of all dicarboxylic acid components of the aromatic polyester constituting the hard segment of the polyester block copolymer.

6. The laminate sheet of claim 1, wherein a dicarboxylic acid other than terephthalic acid out of all dicarboxylic acid components of the aromatic polyester constituting the hard segment of the polyester block copolymer is an aromatic dicarboxylic acid other than terephthalic acid or aliphatic dicarboxylic acid.

7. The laminate sheet of claim 1, wherein tetramethylene glycol is contained in an amount of at least 70 mol % of the total of all diol components of the aromatic polyester constituting the hard segment of the polyester block copolymer.

8. The laminate sheet of claim 1, wherein a diol other than tetramethylene glycol out of all diol components of the aromatic polyester constituting the hard segment of the polyester block copolymer is an aliphatic diol other than tetramethylene glycol or alicyclic diol.

9. The laminate sheet of claim 1, wherein the aromatic dicarboxylic acid is contained in an amount of at least 70 mol % of the total of all dicarboxylic acids of the aromatic polyester constituting the soft segment of the polyester block copolymer.

10. The laminate sheet of claim 1, wherein the aromatic dicarboxylic acid of the aromatic polyester constituting the soft segment of the polyester block copolymer is selected from the group consisting of terephthalic acid, isophthalic acid and naphthalenedicarboxylic acid.

11. The laminate sheet of claim 1, wherein a dicarboxylic acid other than the aromatic dicarboxylic acid out of all dicarboxylic acid components of the aromatic polyester constituting the soft segment of the polyester block copolymer is an aliphatic dicarboxylic acid or alicyclic dicarboxylic acid.

12. The laminate sheet of claim 1, wherein a diol selected from the group consisting of diols represented by the above formula (1) and aliphatic diols represented by the above formula (2) is contained in an amount of at least 70 mol % of the total of all diol components of the aromatic polyester constituting the soft segment of the polyester block copolymer.

13. The laminate sheet of claim 1, wherein the diol represented by the above formula (2) of the aromatic polyester constituting the soft segment of the polyester block copolymer is hexamethylene glycol, decamethylene glycol, 3-methylpentamethylene glycol or 2-methylnonamethylene glycol.

14. The laminate sheet of claim 1, wherein a diol other than the diols represented by the above formulas (1) and (2) out of all diol components of the aromatic polyester constituting the soft segment of the polyester block copolymer is selected from the group consisting of straight-chain aliphatic diols having 2 to 5 carbon atoms and polyoxyalkylene glycols having a molecular weight of 300 to 1,200.

15. The laminate sheet of claim 1, wherein the polyester block copolymer comprises 25 to 50 wt % of a hard segment and 75 to 50 wt % of a soft segment.

16. The laminate sheet of claim 1, wherein the melting point (T,° C.) of the polyester block copolymer satisfies the following expression (3)-1:

$$T_0-5>T>T_0-50 \qquad (3)\text{-}1$$

wherein T and $T_0$ are the same as defined above.

17. The laminate sheet of claim 1, wherein the polyester block copolymer is laminated on one side of the cloth.

18. The laminate sheet of claim 1, wherein the polyester block copolymer is laminated on both sides of the cloth.

19. A method of using the laminate sheet of claim 17 or 18 as cloth for producing a tent.

20. A tent comprising the laminate sheet of claim 17 or 18.

21. The laminate sheet of claim 1, wherein the cloth is made from polyethylene terephthalate.

* * * * *